(12) United States Patent
Peirasso

(10) Patent No.: US 7,073,576 B2
(45) Date of Patent: Jul. 11, 2006

(54) SYSTEM FOR THE CIRCULATION OF THE COOLANT OF THE OIL COOLER FOR THE AUTOMATIC TRANSMISSION OF A MOTOR VEHICLE

(75) Inventor: Piero Peirasso, Grugliasco (IT)

(73) Assignee: Fiat Auto S.p.A., Turin (IT)

( * ) Notice: Subject to any disclaimer, the term of this patent is extended or adjusted under 35 U.S.C. 154(b) by 90 days.

(21) Appl. No.: 10/473,896

(22) PCT Filed: May 7, 2002

(86) PCT No.: PCT/EP02/05005

§ 371 (c)(1),
(2), (4) Date: Dec. 11, 2003

(87) PCT Pub. No.: WO02/095266

PCT Pub. Date: Nov. 28, 2002

(65) Prior Publication Data

US 2004/0112575 A1    Jun. 17, 2004

(30) Foreign Application Priority Data

May 18, 2001  (IT)  .......................... TO2001A0456

(51) Int. Cl.
*F01P 3/12*  (2006.01)
*F01P 3/18*  (2006.01)
*F01P 7/16*  (2006.01)
*F16H 57/04*  (2006.01)

(52) U.S. Cl. .......................... 165/297; 165/51; 165/916; 123/41.1; 123/41.31; 123/41.33; 123/41.08; 123/41.09; 123/196 AB; 236/34.5

(58) Field of Classification Search ............... 123/41.1, 123/41.31, 41.33, 41.08, 41.09, 196 AB; 165/916, 51, 297; 236/34.5
See application file for complete search history.

(56) References Cited

U.S. PATENT DOCUMENTS

| | | |
|---|---|---|
| 3,874,183 A | 4/1975 | Tabet |
| 5,125,368 A | 6/1992 | Tzavaras |
| 5,217,085 A | 6/1993 | Barrie et al. |

FOREIGN PATENT DOCUMENTS

| | | | |
|---|---|---|---|
| EP | 251214 A | * | 1/1988 |
| EP | 0 544 552 | | 6/1993 |
| FR | 2292109 A | * | 7/1976 |

* cited by examiner

Primary Examiner—John K. Ford

(57) ABSTRACT

Circulation system for the coolant in an oil cooler (13) adapted to cool down the oil of the automatic transmission (2) of a motor vehicle in which the drain conduit (15) for the coolant from the oil cooler (13) of the transmission (2) is connected to said return conduit from the radiator, and that the exit mouth (16), of said drain conduit is inserted in the return conduit forming an angle A, said angle being more than 0° and less than 90°.

3 Claims, 2 Drawing Sheets

SYSTEM FOR THE CIRCULATION OF THE COOLANT OF THE OIL COOLER FOR THE AUTOMATIC TRANSMISSION OF A MOTOR VEHICLE

The present invention refers to a system for the circulation of the coolant in an oil cooler of the transmission of a motor vehicle, more in particular for motor vehicles with automatic transmission.

Commercial motor vehicles of limited capacity, can present automatic transmissions, which generally implement simple air cooled radiators which guarantee acceptable levels in the temperature of the oil of the transmission so that the transmission itself works properly and lasts in time.

Said radiators cannot be implemented on commercial vehicle due to the very low speed of the vehicle itself especially on steep slopes, and to the consequent poor air flow on said radiator.

In order to make the automatic transmission work at its best, it is therefore necessary to use oil coolers of the known type, which are already available on the market. However, said oil coolers need an auxiliary electric pump and its relative installation and control system in case it is not possible, for any reasons (water too hot, connection problems, etc) to place them into the cooling circuit of the motor, upstream and next to the main water pump.

The overall installation costs are therefore significantly increased, and there are more risks of failure and of high operation load for the battery.

It is an object of the present invention to provide a circulation system for the coolant of an oil cooler that overcomes the aforementioned drawbacks.

Said object is achieved by means of a circulation system for the coolant in an oil cooler as claimed in claim 1.

Figure 1:
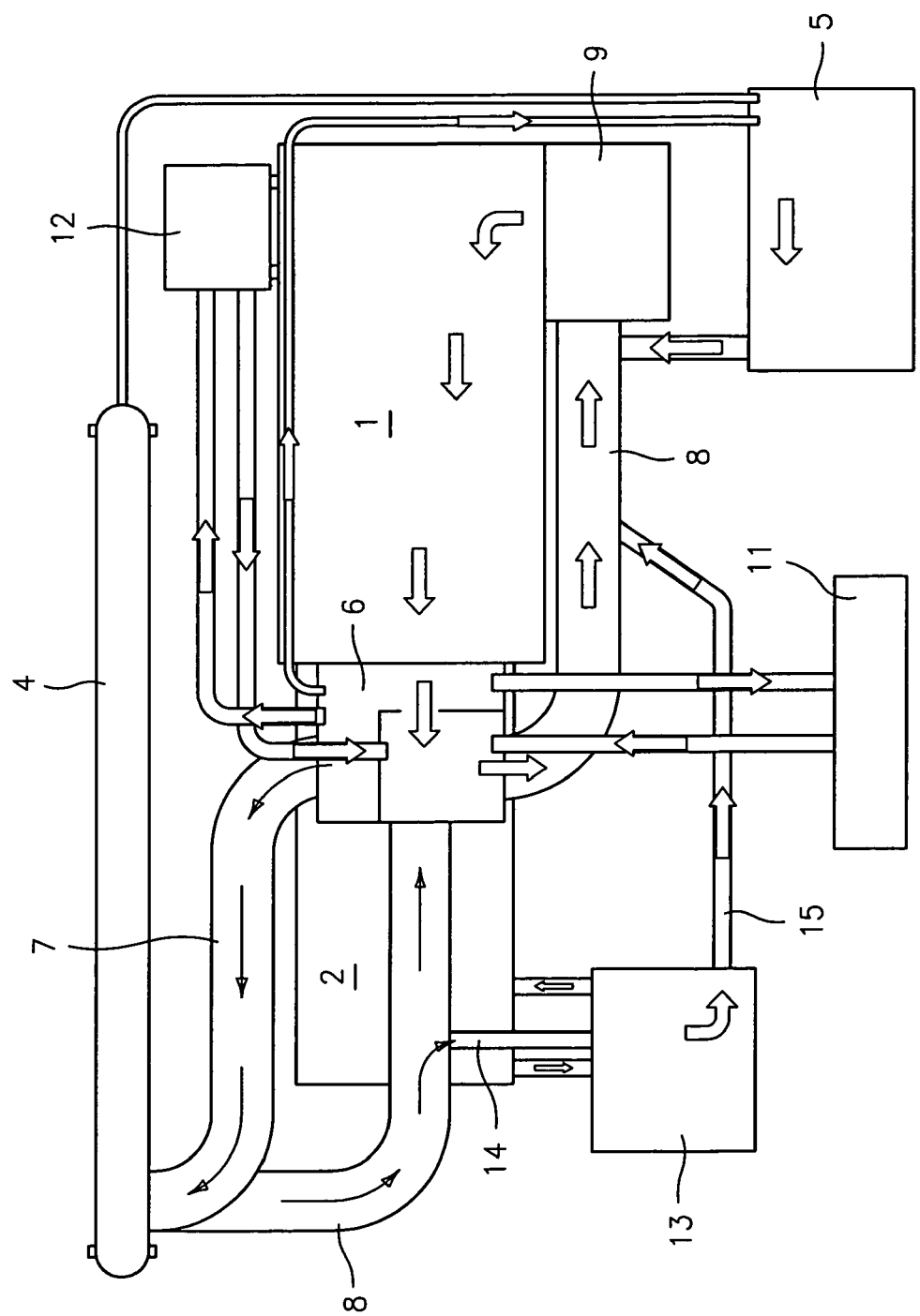
Figure 2:
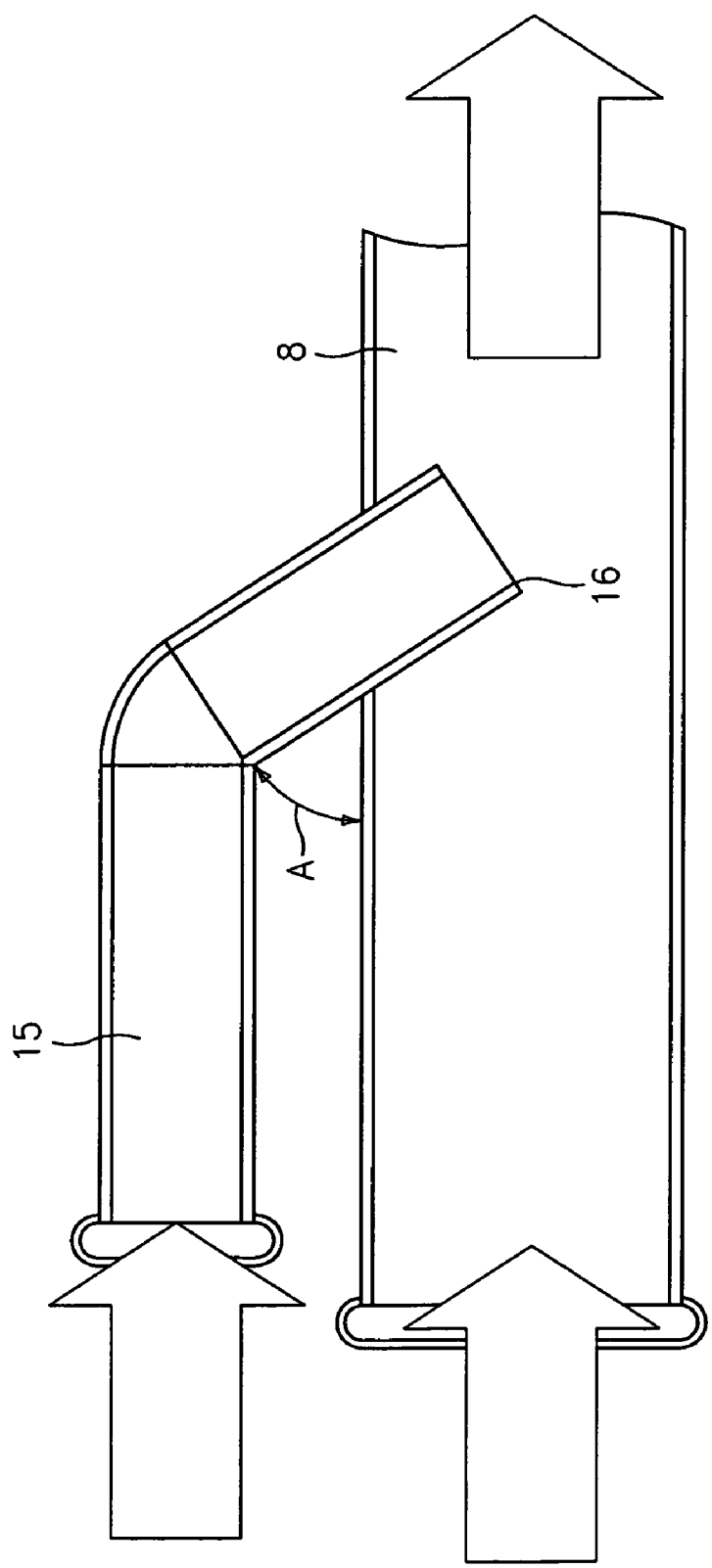

Additional characteristics and advantages will become clear from the following description referring to the appended drawings provided as non-restrictive example and in which:

FIG. 1 is a plan view of a scheme of a cooling system for the engine of a motor vehicle, including the circulation system according to the invention, and FIG. 2 is a magnified section view of a detail of the system shown in FIG. 1.

With reference to the figures, reference number 1 indicates schematically an engine for a motor vehicle provided with automatic transmission 2 containing oil. The cooling system of the engine 1, here schematically shown, includes a radiator 4 provided with an expansion tank for the coolant 5, generally consisting of water mixed with antifreezing fluid, a thermostat 6 connected to the radiator by means of a delivery conduit 7 and a return conduit 8. The return conduit further connects said thermostat 6 to the pump 9 for the coolant, which guarantees the circulation of the coolant itself in the engine. The system further consists of a heater 11 for the passenger compartment and of an oil cooler 12, both being fed by the coolant pump under control of the thermostat 6.

The automatic transmission 2 is provided with its own oil cooler 13 where the circulation of the water, according to the invention, is achieved as disclosed in the following, not by means of a pump but thanks to the flow of the coolant in the return conduit 8 from the thermostat 6 to the pump 9 of the main circuit. Said conduit is the one where the flow is constant and higher in intensity.

The oil cooler 13 of the transmission is therefore provided with a delivery conduit 14 for the coolant, which is obtained by connecting said conduit to the return conduit 8 from the radiator 4, that is from the conduit where the coolant presents the most suitable temperature for the whole system. The drain conduit 15 of the oil cooler 13 is connected to the part of the return conduit 8 from the thermostatic device 6 to the pump 9 for the coolant.

In order to take maximum advantage from the flow of the fluid sucked by the w pump 9, the connection of the drain 15 to the return conduit is to be realised as described in the following description referring to FIG. 2.

The end of the conduit 15 is to be sectioned in a direction which is basically perpendicular to its own axis, and the mouth 16 of the conduit is to be introduced into the conduit 8 until it reaches its central axis, where the flow of the coolant is higher, forming an angle A with the axis of said conduit 8, said angle being more than 0° and less than 90°, preferably between 40° and 50°, when measured from the side of the oil cooler.

With this arrangement, the flow of the fluid in the conduit 8 creates a vortex at the mouth 16 of the conduit 15, said vortex generating a depression which can suck the fluid inside the conduit 15 and consequently produce a cooling circulation in the oil cooler 13 associated to the automatic transmission 2, with no need of an auxiliary pump.

The invention is obviously not limited to the embodiment here described and can be realised in equivalent ways without going beyond the scope of the present invention.

The invention claimed is:

1. A circulation system for circulating coolant to an oil cooler for cooling oil of an automatic transmission of a motor vehicle having an engine, a radiator, a delivery conduit for delivering coolant from the engine to the radiator, and a return conduit for returning coolant from the radiator to the engine, the circulation system comprising:
   a thermostatic device positioned along the return conduit;
   an oil cooler delivery conduit connected between the oil cooler and the return conduit upstream of the thermostatic device; and
   a drain conduit connected from the oil cooler to the return conduit downstream of the thermostatic device, wherein the drain conduit has an exit mouth which is inserted in the return conduit and forms an angle with a central axis of the return conduit, the angle being more than 0 degrees and less than 90 degrees, and wherein the exit mouth is inserted into the return conduit to the central axis.

2. The system as claimed in claim 1, wherein the angle is between 40 degrees and 50 degrees.

3. The system as claimed in claim 1, wherein the drain conduit has a central axis, and wherein the exit mouth has an end surface which is substantially perpendicular to the central axis of the drain conduit.

* * * * *